United States Patent [19]
Platter et al.

[11] Patent Number: 5,366,642
[45] Date of Patent: Nov. 22, 1994

[54] COMPACT WATER FILTRATION AND PURIFICATION PUMP

[75] Inventors: Sanford Platter; Jeffrey K. Aldred; Richard J. Kraemer, all of Boulder, Colo.

[73] Assignee: KPA, Incorporated, Boulder, Colo.

[21] Appl. No.: 990,526

[22] Filed: Dec. 15, 1992

Related U.S. Application Data

[63] Continuation-in-part of Ser. No. 682,650, Apr. 9, 1991.

[51] Int. Cl.$^5$ ............................................. B01D 35/26
[52] U.S. Cl. ..................................... 210/767; 210/232; 210/237; 210/238; 210/416.3; 210/541; 210/542; 417/238
[58] Field of Search ................. 210/767, 416.3, 416.1, 210/416.2, 416.4, 416.5, 232, 237, 238, 282, 541, 542; 417/544, 238, 319, 234; 285/13, 14; D8/307, 308, DIG. 10; D15/142

[56] References Cited

U.S. PATENT DOCUMENTS

| | | | |
|---|---|---|---|
| 2,892 | 12/1842 | Bishop | 210/416.3 |
| 206,448 | 7/1878 | Helmecke | 417/544 |
| 341,923 | 5/1886 | Laing et al. | 417/544 |
| 415,927 | 11/1889 | Stiles | 210/416.3 |
| 454,609 | 6/1891 | Brown | 417/544 |
| 472,547 | 4/1892 | Nordtmeyer | 210/416.3 |
| 481,606 | 8/1892 | Wasson | 210/416.3 |
| 597,226 | 1/1898 | Temple | 417/234 |
| 1,906,391 | 5/1933 | McKinley | 210/413 |
| 2,338,418 | 4/1944 | Forrest et al. | 210/416.5 |
| 2,436,077 | 2/1948 | Robertson | 210/416.3 |
| 2,473,986 | 6/1949 | Booth | 210/185 |
| 2,526,656 | 10/1950 | Goetz | 210/416.3 |
| 2,566,371 | 9/1951 | Quinn | 210/416.3 |
| 2,670,081 | 2/1954 | Quinn | 210/416.3 |
| 3,289,847 | 12/1966 | Rothemund | 210/266 |
| 3,327,859 | 6/1967 | Pall | 210/266 |

(List continued on next page.)

FOREIGN PATENT DOCUMENTS

| | | | |
|---|---|---|---|
| 925355 | 5/1963 | France | B66F 3/42 |
| 732382 | 3/1943 | Germany | 417/234 |
| 507492 | 12/1954 | Italy | 417/234 |
| 593300 | 11/1947 | United Kingdom | F04B 81/06 |
| 660024 | 10/1951 | United Kingdom | . |
| 2112874 | 7/1983 | United Kingdom | F04B 33/00 |
| WO8810239 | 12/1988 | WIPO | C02F 9/00 |
| WO9119555 | 12/1991 | WIPO | B01D 24/08 |

OTHER PUBLICATIONS

"Instantly drinkable water anywhere with the Katadyn Pocket Filter" (new product brochure), Katadyn U.S.A., Inc. Scottsdale, Arizona.

"WaterWorks Total Filtration System" (new products catalog), Mountain Safety Research, Seattle, Washington, plus Tech Sheet, Jan. 1991.

Primary Examiner—Cynthia L. Nessler
Attorney, Agent, or Firm—Duft, Graziano & Forest

[57] ABSTRACT

A portable, manually-operated water filtration pump for purifying water. The pump includes an inexpensive, disposable filter cartridge which can be easily changed when the filter elements are no longer effective. The pump uses a lever to actuate a double-acting piston. The lever is collapsible to one side of the pump for compact storage. The filter cartridge is a tubular cylinder having an inner bore forming the pump cylinder. A cylindrical mechanical filter is concentric with and adjacent to the inner bore to filter out particulates larger than 0.3 microns. A fluidized granular activated charcoal filter surrounds the mechanical filter to absorb chlorine and chlorine-related compounds such as herbicides and pesticides. The pump pumps filtered water into a bottle adaptor which will fit most standard water containers. A prefilter is provided to screen out large particulates from the pump to enhance the life of the filter elements. The prefilter is shaped such that it will sink in water sources and to keep the prefilter inlet upright in still water or downstream in moving water.

20 Claims, 11 Drawing Sheets

U.S. PATENT DOCUMENTS

| | | | |
|---|---|---|---|
| 3,469,696 | 9/1969 | Petrucci et al. | 210/97 |
| 3,583,836 | 6/1971 | Evans | 417/394 |
| 3,715,035 | 2/1973 | Teeple, Jr. et al. | 210/249 |
| 3,730,651 | 5/1973 | Ellis | 417/234 |
| 3,950,253 | 4/1976 | Stern | 210/282 |
| 3,966,364 | 6/1976 | Bachle et al. | 417/539 |
| 3,995,966 | 12/1976 | Blancha | 417/254 |
| 4,013,562 | 3/1977 | Gott | 210/232 |
| 4,151,092 | 4/1979 | Grimm et al. | 210/256 |
| 4,187,173 | 2/1980 | Keefer | 210/23 H |
| 4,196,081 | 4/1980 | Pavia | 210/94 |
| 4,277,333 | 7/1981 | Coppola | 210/136 |
| 4,298,475 | 11/1981 | Gartner | 210/266 |
| 4,389,311 | 6/1983 | La Freniere | 210/198.1 |
| 4,430,213 | 2/1984 | Ishikawa | 210/136 |
| 4,443,336 | 4/1984 | Bennethum | 210/238 |
| 4,477,347 | 10/1984 | Sylva | 210/232 |
| 4,485,015 | 11/1984 | Smith | 210/474 |
| 4,495,068 | 1/1985 | Rosaen | 210/91 |
| 4,500,425 | 2/1985 | Thornton et al. | 210/136 |
| 4,515,378 | 5/1985 | Marshall | 277/152 |
| 4,540,489 | 9/1985 | Barnard | 210/287 |
| 4,605,499 | 8/1986 | Wise | 210/282 |
| 4,622,136 | 11/1986 | Karcey | 210/168 |
| 4,632,757 | 12/1986 | Rosenberg | 210/411 |
| 4,673,501 | 6/1987 | Wells et al. | 210/474 |
| 4,894,154 | 1/1990 | Roz et al. | 210/266 |
| 4,913,808 | 4/1990 | Haque | 210/93 |
| 4,968,439 | 11/1990 | Leveen et al. | 210/764 |
| 5,004,536 | 4/1991 | Geisler | 210/136 |
| 5,019,252 | 5/1991 | Kamei et al. | 210/136 |
| 5,066,391 | 11/1991 | Faria | 210/85 |
| 5,092,990 | 3/1992 | Muramatsu et al. | 210/136 |
| 5,106,500 | 4/1992 | Hembree et al. | 210/266 |
| 5,116,502 | 5/1992 | Ferguson | 210/266 |
| 5,120,437 | 6/1992 | Williams | 210/244 |
| 5,126,041 | 6/1992 | Weber et al. | 210/136 |
| 5,266,196 | 11/1993 | Fife et al. | 210/416.3 |
| 5,268,093 | 12/1993 | Hembree et al. | 210/136 |

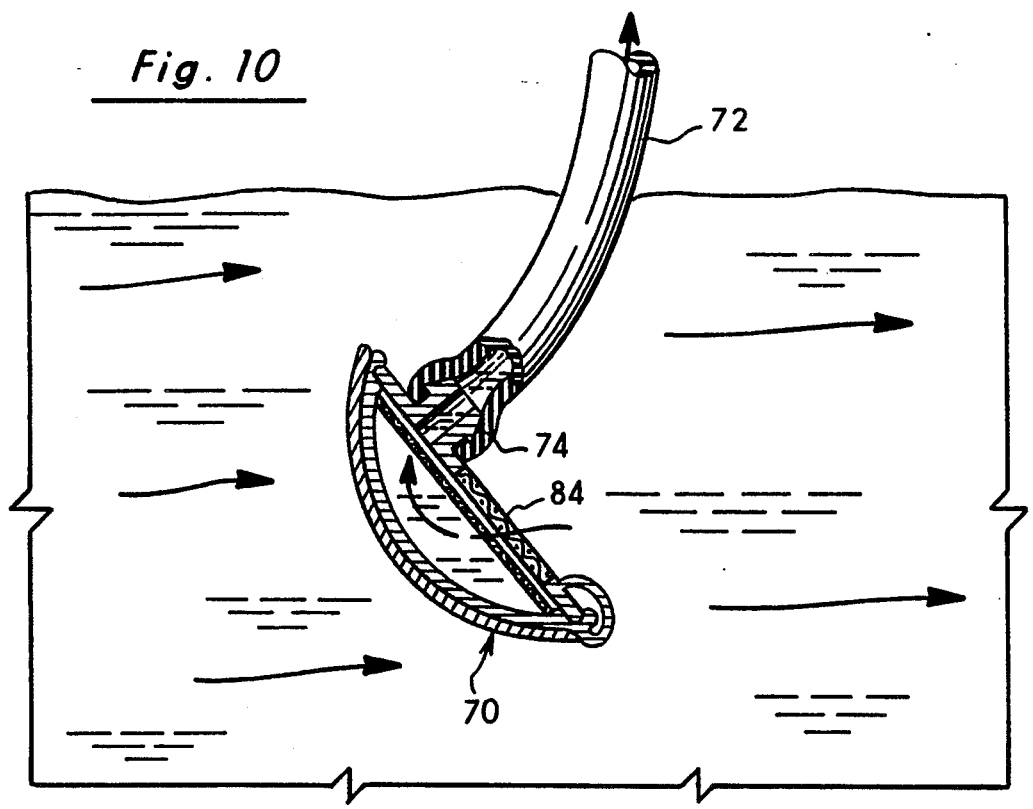
Fig. 10
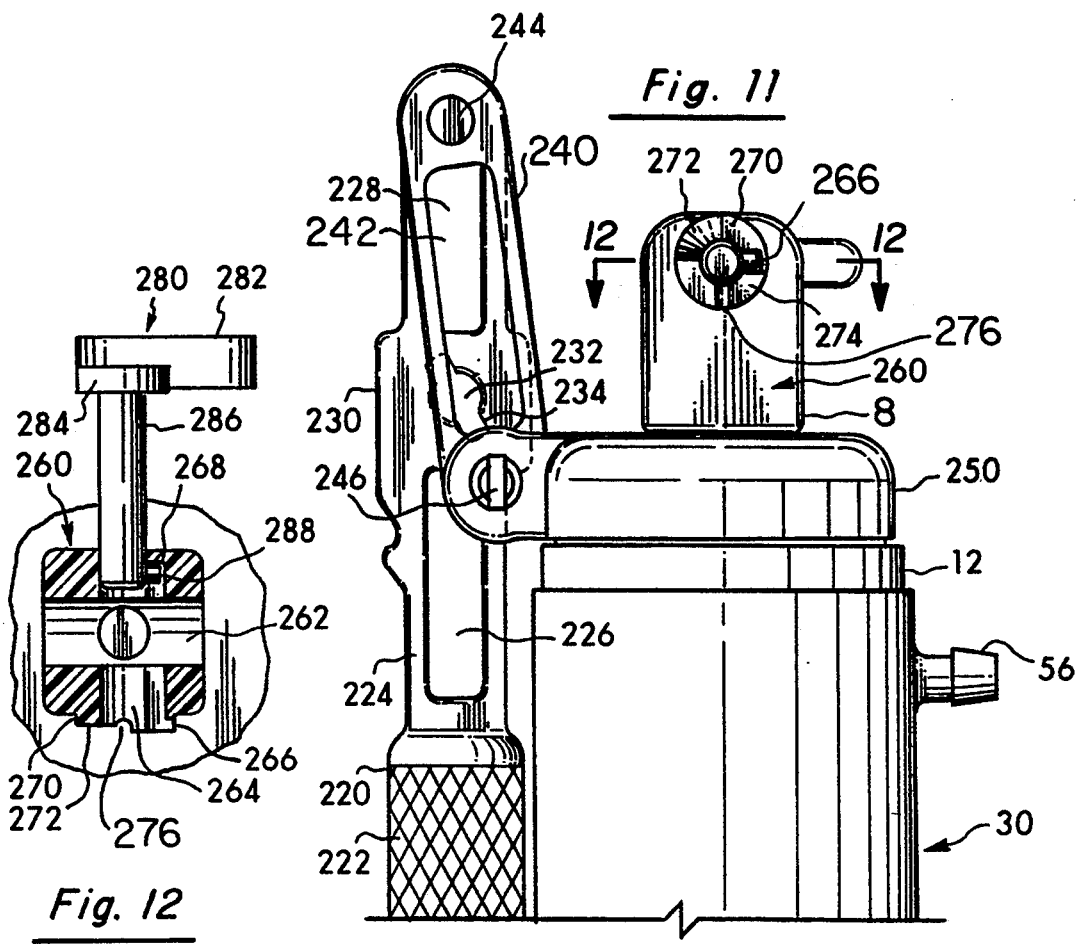
Fig. 11
Fig. 12

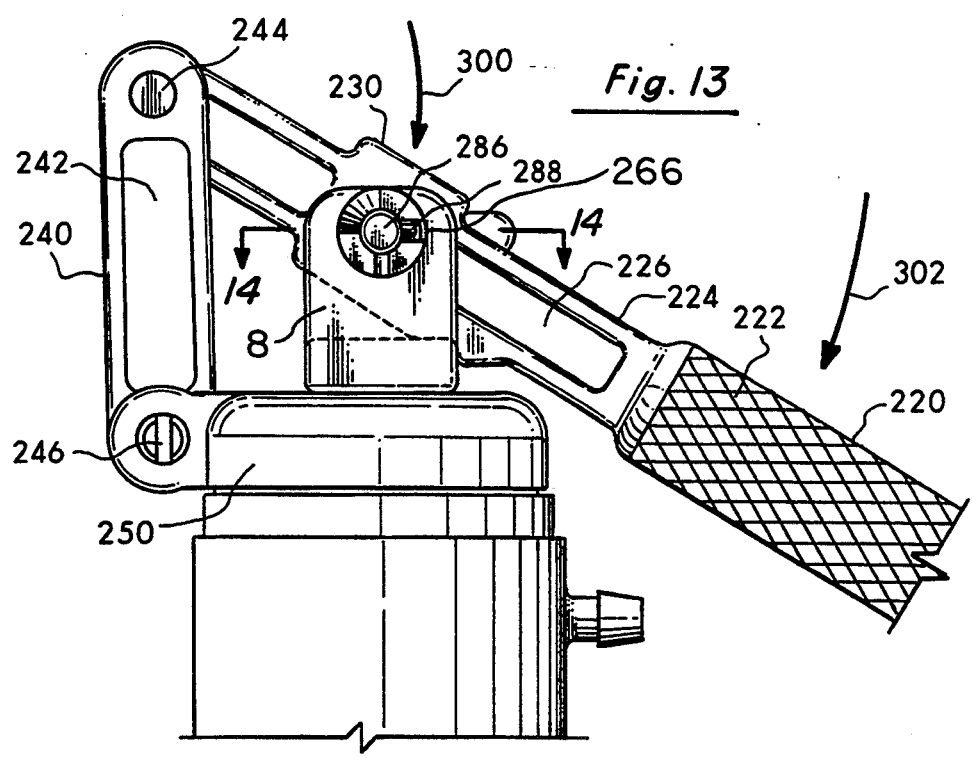
Fig. 13
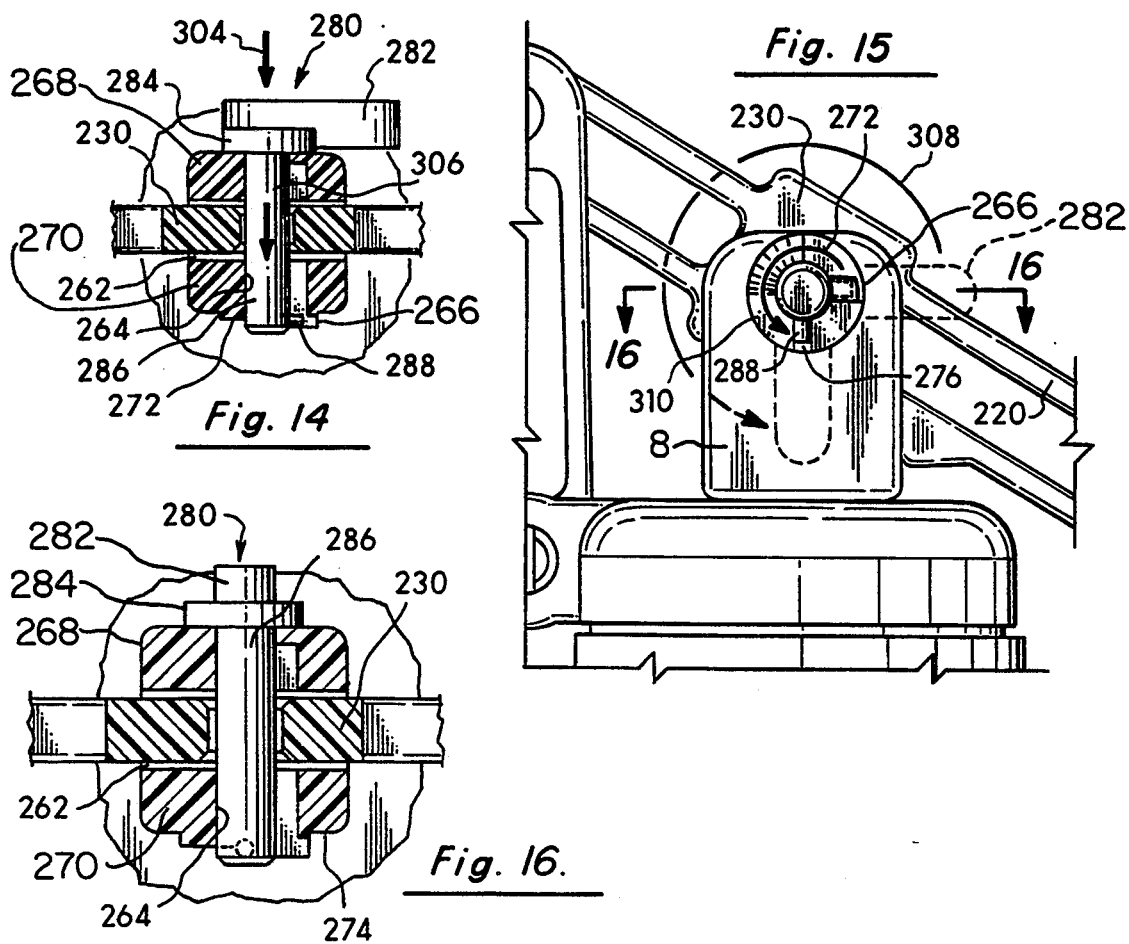
Fig. 14
Fig. 15
Fig. 16.

COMPACT WATER FILTRATION AND PURIFICATION PUMP

BACKGROUND OF THE INVENTION

Related Applications

This application is a continuation-in-part of U.S. patent application Ser. No. 07/682,650, filed Apr. 9, 1991.

FIELD OF THE INVENTION

This invention relates to the field of water purification units, and particularly to the field of portable water filtration pumps for back-country or travel use and other applications where manual water purification is required.

STATEMENT OF THE PROBLEM

Water purification is a critical problem today's world. There presently are a large number of systems available for home and industrial water purification. However, these units are relatively large and designed to be affixed to a pressurized water source. A strong need exists for a portable system of water purification, particularly for a lightweight, compact water filtration unit. Such a unit is necessary for purifying water sources for travelers, campers, backpackers, fishermen, hunters, rafters, in emergency situations, and the like.

Water sources, even those that appear to be clear, are often contaminated. Water contaminants include particulate matter, chemicals, insects, nematodes, fungi, algae, yeasts, microorganisms, discoloration and radioactive contamination. The microorganisms often found in water sources include pathogenic microbes such as protozoa (which includes Giardia Lamblia), bacteria, and viruses. Chemicals often found in water sources include halogens and other halogen related compounds such as herbicides and pesticides.

Present portable systems for water purification are of three types: boiling, chemical treatment, and mechanical filtration. Boiling water is time consuming and requires the need for fire. Also, boiling water will only kill microorganisms. It does not remove the contaminants. Chemical treatments, such as iodine tablets, leave an aftertaste, and may produce an allergic reaction with some people. Also, chemical treatments will only kill microorganisms and do not remove contaminants.

The only filtration systems that actually remove contaminants from the water are mechanical filtration units. Typically, mechanical filtration units are of two types, passive filtration units and pump filtration units.

Passive filtration systems typically use a water bag having a filtration system in the bottom of the bag. Water is poured into the bag which is then hung onto a tree or elevated structure. Water flows downward under the force of gravity through the filters in the bag and into a reservoir. This type of system is cumbersome to transport, operates slowly and requires frequent replacement of the filters due to bacteria growth in the filters.

There are presently several pump-type water purifiers available on the market. One such device is the FIRST NEED WATER PURIFIER, available from General Ecology, Inc. 151 Sherree Blvd, Lionville, Pa. This purifier uses a handle to move a pump piston vertically in a cylinder. A canister containing a charcoal filter is mounted parallel to the cylinder and is connected by plastic tubing to the cylinder. The bottom of the cylinder has another piece of tubing which is placed in the water source. The bottom of the canister has a short piece of tubing which is placed in the water container. Operation of the handle pumps water through the canister to filter the water. This system weighs approximately sixteen ounces and requires frequent sterilization of the filter halogen to prevent bacteria growth. The canister requires replacement at periodic intervals. The replacement canisters are relatively expensive. This system, under normal usage, purifies water at the rate of one quart per ninety seconds. A prefilter is recommended for use with this system.

Another popular portable water purification filter is manufactured by Katadyn. This system uses a ceramic filter. It also uses a handle type pump to move water through the system. This system is expensive compared with other devices.

A third commercially available water filter pump is the MSR WATERWORKS FILTER, manufactured by Mountain Safety Research, Seattle, Wash. This system uses a small, horizontally-mounted pump with a lever to pump water through a series of filters. These filters include an articulated urethane foam prefilter, a fine mesh stainless steel screen, a cylinder of activated carbon and a micro-porous membrane cartridge having a pore size ratio of 0.1 micron absolute. This system screws on to a water container. This system is relatively expensive with expensive replacement filters. The approximately weight of this system is 20 ounces. Other devices are known, that typically use a separate pump and filter mechanism. These devices are cumbersome to operate and are relatively slow to filter water.

In summary, the prior filtration systems are relatively cumbersome to store and use. None of these units has the capacity to fold for compact storage. Also, these units require two hands to operate. This creates an opportunity for spillage of the filtered water.

An additional problem with the prior filtration units is the turbulent fluid flow through the pumps. Non-laminar (turbulent) fluid flow creates problems in the pumping process. These problems include uneven fluid flow through the pump, pressure drops in the filters, erosion of the pump components and filters, and increased user workload. Pressure drops are created in the prior pumps pump due to higher flow in one direction of the pump piston than the other direction of the pump piston. This pressure drop requires increased work in pumping water through the filters. Also, the pressure drop can decrease the life and efficiency of the filtering process.

There presently exists a need for a lightweight, compact, inexpensive water purification pump that operates with uniform flows at high rates without extensive exertion.

SOLUTION TO THE PROBLEM

The present invention comprises a solution to these and other problems. The present invention provides a lightweight pump capable of compact storage and the filtering of fluid at high rates with minimal exertion.

The present invention further comprises a portable, manually-operated, water filtration pump for filtering water having harmful contamination. The pump uses a lever for actuating a piston at a mechanical advantage. This lever is collapsible to one side of the pump for compact storage. The lever is easily secured to the piston for actuation of the pump. In one preferred embodiment, the pump is secured onto the piston by a "captured pin" which engages a detent to fasten the handle to the piston.

The pump includes an inexpensive, disposable filter cartridge which can be easily changed when the filter elements are no longer effective. The filter cartridge is a tubular cylinder having an inner bore through which the piston is movable.

An inlet having a screen mesh is located at the bottom of the inner bore of the filter cartridge. A check valve is provided adjacent the inlet to allow water to enter during the upstroke of the piston but prevents water from leaving during the downstroke of the piston. A flexible seal is provided on the piston which prevents water from flowing around the piston during the upstroke but allows water to flow around the piston during the downstroke. This provides a double-acting piston for uniform fluid flow and uniform pressure during the pumping process.

Water is pumped from the inner bore through a baffle into an inner plenum. The baffle prevents high velocity jet flow to assure a laminar flow into the inner plenum. The inner plenum has an annular width chosen to minimize pressure drops and to provide uniform flow through the filter. This laminar flow and minimal pressure drops reduce the work required for the pumping process as well as minimizing erosion of the pump and filters.

A cylindrical mechanical filter is concentric with the inner bore adjacent the inner plenum to filter out particulates larger than 0.1 micron. A fluidized granular activated charcoal filter surrounds the mechanical filter to absorb halogens and halogen-related compounds such as herbicides and pesticides. A screen prevents the granular activated charcoal from moving through the system.

An outer plenum is provided for the filtered water to exit the charcoal filter in a uniform flow. The outer plenum is connected through an outlet to a bottle adaptor which will fit most standard water containers. The adaptor will prevent spillage of the treated water in the container during the pumping process or contamination of the treated water.

A prefilter is provided to screen out large particulates from the pump to enhance the life of the filter elements. The prefilter is connected by an offset inlet opening so the prefilter will sink in water sources with the inlet staying upright in still water or downstream in moving water.

The pump of the present invention is designed to be relatively inexpensive, and uses recyclable inexpensive filters. The pump is lightweight, approximately 0.25 to 0.32 pounds, capable of pumping greater than 1.5 liters per minute in normal use and is compact, about eight inches long with a diameter of about 2 inches. The pump is formed of lightweight durable components to withstand rugged use and can be easily used by one person.

These and other features will become evident from the detailed description of a preferred embodiment taken in conjunction with the drawing.

BRIEF DESCRIPTION OF THE DRAWING

FIG. 10 is a side cutaway view of the prefilter in moving water.

FIG. 11 is a side view showing a second embodiment of the collapsible pump handle.

FIG. 12 is a top view of the collapsible pump handle of FIG. 11.

FIG. 13 is a side view of the collapsible pump handle of FIG. 11 secured on the piston.

FIG. 14 is a top view of the pump handle of FIG. 11 in a first stage of mounting.

FIG. 15 is a side view of the pump handle of FIG. 11 in a second stage of mounting.

FIG. 16 is a top view of the apparatus of FIG. 15.

DETAILED DESCRIPTION OF A PREFERRED EMBODIMENT

The present invention comprises a portable compact lightweight water filtration pump which effectively filters particles down to 0.1 microns (a micron equals one-millionth of a meter). The pump of the present invention provides uniform flow at rates greater than 1.0 liters per minute with normal usage. The pump is easily usable by one person with minimal exertion. This device is relatively inexpensive and uses inexpensive, disposable filters which purify up to 100 gallons of water. The disposable filters are recyclable and easy to change.

One possible preferred embodiment is illustrated in FIGS. 1-6. This description of a preferred embodiment is for explanatory purposes and is not meant to limit the scope of the claimed inventive concept. Other variations and embodiments are considered to be within the scope of the claimed inventive concept.

The water filtration pump of the present invention includes a pump housing, a filter cartridge, and a double-acting piston, all of which are discussed in detail below.

Pump Housing

Figure 1:
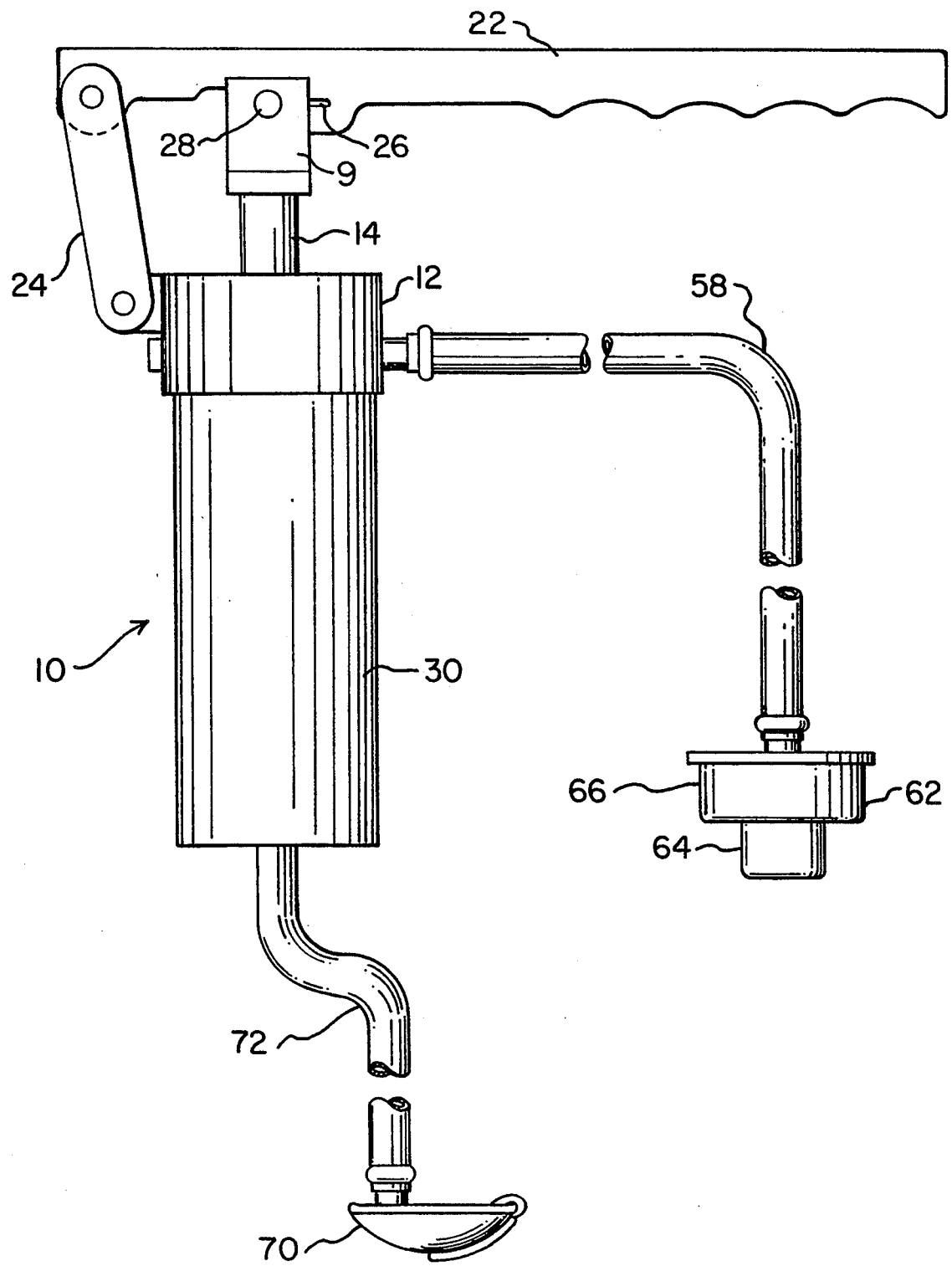
FIG. 1 is a side view of one possible preferred exemplary embodiment of the invention.
Figure 2:
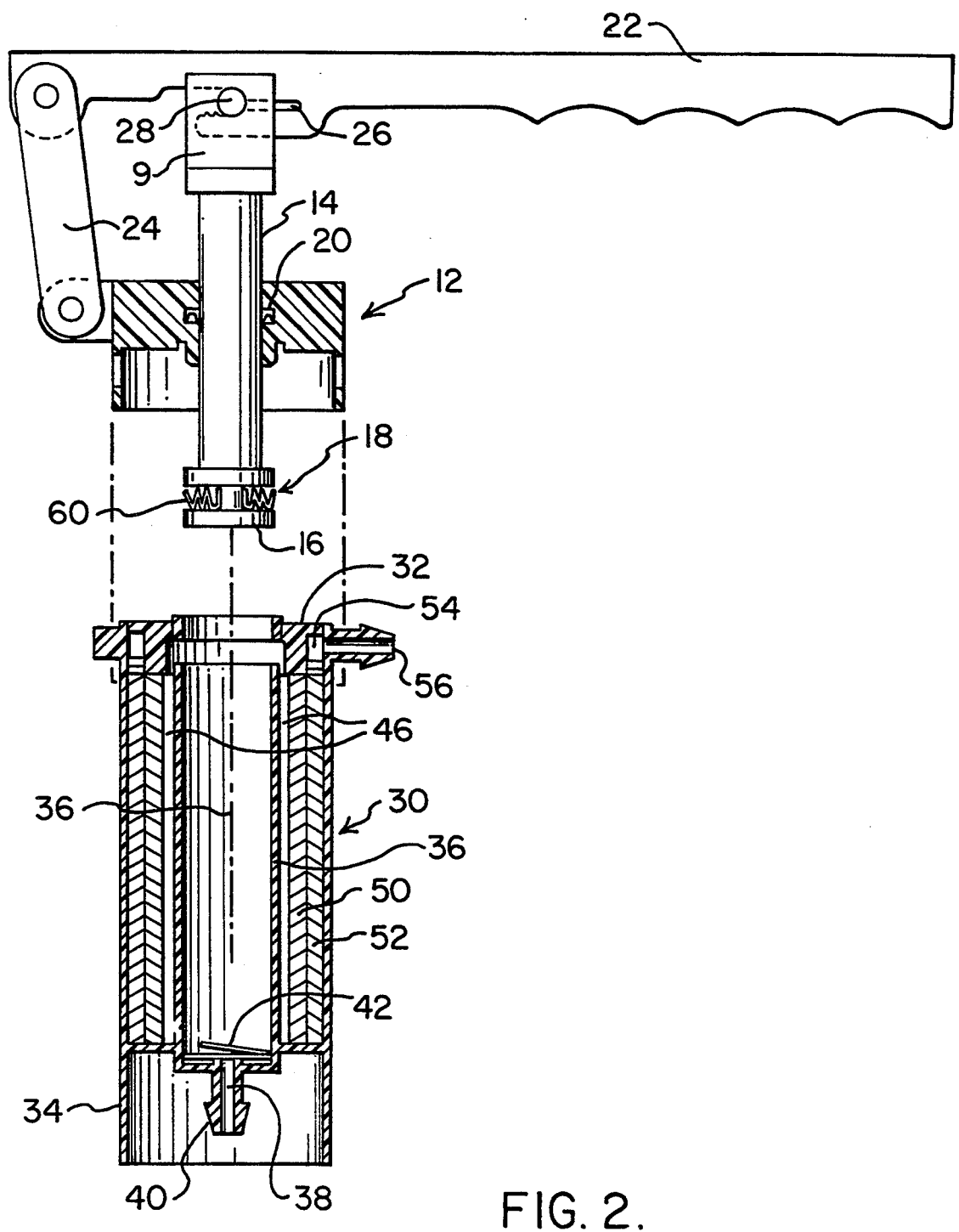
FIG. 2 is a cutaway view of the pump of FIG. 1 disassembled from the disposable filter cartridge.

Water filtration pump 10 of the present invention is shown in FIG. 1. Pump 10 may also include prefilter 70 and container adapter 62, both of which are discussed fully below. Pump 10 includes pump housing 12, as shown in FIG. 2, having a cylindrical shape and an inner bore in which piston rod 14 is slidable therein. Piston 16 is formed or mounted on one end of piston rod 14. Seal groove 18 is formed around the circumference of piston 16 as described below. O-ring or U-cup seal 20 or any well-known type of seal is mounted in housing 12 allowing piston rod 14 to pass through housing 12 while preventing water from the force of piston 16, as described below, from passing upward through housing 12 or contaminates from passing down through housing 12. Cross head 9 is affixed to the upper end of piston rod 14.

Slot 26 of lever 22 engages pin 28 on cross head 9. Lever 22 is also attached to housing 12 by pivot link 24. This allows lever 22 to move piston 16 up and down in cartridge 30 as described below with a mechanical advantage. In the embodiment described, the mechanical advantage is three to five times. This enables the lever to exert three to five times the force as would the same effort moving piston 16 up and down without the lever advantage.

Figures 3, 4:
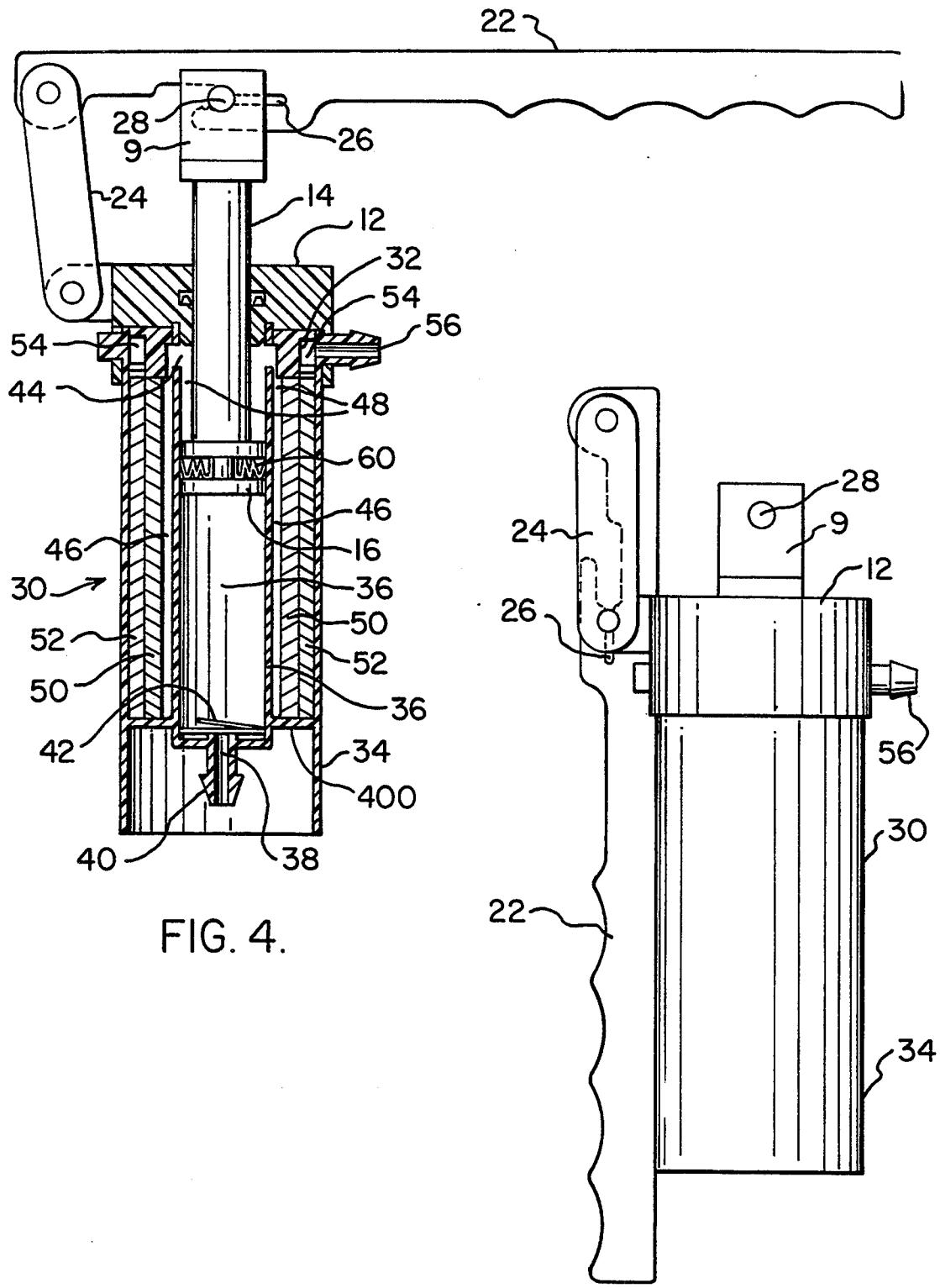
FIG. 3 is a cutaway view of the pump of FIG. 1 with the handle in the storage position.
FIG. 4 is a cutaway view of the pump of FIG. 1 with the handle in the operating position and the piston in an upstroke.

Lever 22 is designed to be moved to a storage position when pump 10 is not in use. Lever 22 is unhooked from pin 28 and collapsed to one side of pump 10 as shown in FIG. 3. This provides a compact unit for storage and transportation. This can be an important concern for travelers and backpackers who have limited space available.

Filter Cartridge

Filter cartridge 30 is designed to be quickly and easily attached to housing 12. In the described preferred embodiment, this is accomplished by a screw mounting attachment. Filter cartridge 30 is screwed into the lower portion of housing 12 and rotated until the mounting is secure. Seal 32 is provided between housing 12 and filter cartridge 30 to prevent leakage at the connection between the housing 12 and filter cartridge 30. The present invention is not meant to be limited to this descriptive embodiment but encompasses other variations. For instance, the filter cartridge may use a bayonet attachment, or a snap-on attachment, or other well-known attachment devices.

Filter cartridge 30 includes an outer tubular plastic cylinder 34. Inner bore 36 is formed in filter cartridge 30 having an inner diameter that enables piston 16 to closely fit within along with a flexible seal as discussed below. At the lower end of inner bore 36 is an inlet 38 for allowing unfiltered water to enter into filter cartridge 30. In the preferred embodiment, inlet 38 includes an extended outer barb 40 on which a section of tubing is attached. Inlet check valve 42 is mounted in inner bore 36 adjacent inlet 38. Inlet check valve 42 is a cantilevered reed valve which allows water to enter filter cartridge 30 but prevents water from exiting through inlet 38. The operation of inlet check valve 42 is discussed in detail below.

Double-acting Piston

Figure 5:
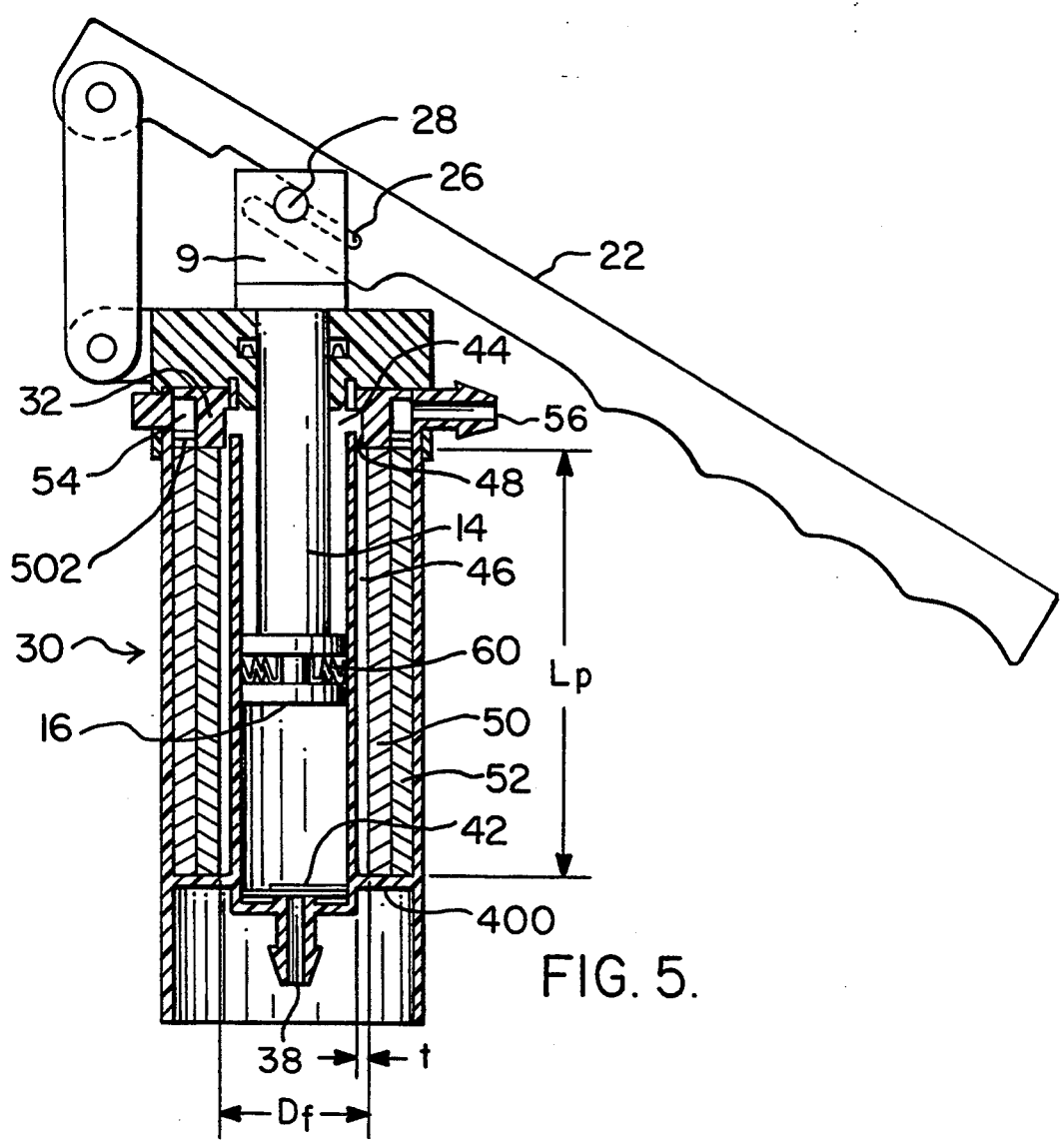
FIG. 5 is a cutaway view of the pump of FIG. 1 with the piston in a downstroke.

Flexible seal 60 is mounted within groove 18 of piston 16 as illustrated in FIGS. 2, 4 and 5. Seal 60 is formed from an elastomer or an elastomer-like thermoplastic. Seal 60 mounted within groove 18 (FIG. 2) of piston 16 allows piston 16 to be double acting to provide uniform flow and pressure during both the upstroke and downstroke of piston 16. Seal 60 has an accordion-like, flexible lip that moves toward the wall of inner bore 36 during the piston upstroke so water above piston 16 is forced around the top of inner bore 36 and through baffle area 48 (FIG. 4) and into inner plenum 46. At the same time, water is being drawn upward through inlet 38 and through the open inlet check valve 42 as shown in FIG. 4. The outer lip of seal 60 moves away from the wall of inner bore 36 during the downstroke of piston 16 by the force of the water as shown in FIG. 5. The water below piston 16 is forced downward, thus closing cantilevered reed check valve 42 or similar valve to force the water upward around piston 16 and by seal 60 as shown in FIG. 5.

Filters

Inlet 44, shown in FIGS. 4 and 5, is formed at the upper end of inner bore 36 leading into inner plenum 46. Inner plenum 46 surrounds inner bore 36 and is critically sized as discussed below. Baffle 48 is formed in inlet 44 to prevent high jet velocity flow into inner plenum 46 and to provide laminar flow from inner bore 36 into inner plenum 46. As discussed in the background section, non-laminar flow results in uneven flow, high pressure drops and increased user work. Also the life of the pump and filter is reduced due to erosion. Baffle 48 is formed of a non-erodible material such as structural plastic. Flow from inner bore 36 is forced through inlet 44 against baffle 48 which directs the fluid flow parallel to the surface of filter 50. This parallel flow encourages laminar flow. Also, the water is allowed to enter filter 50 more easily without increased pressure necessary.

Adjacent inner plenum 46 is mechanical filter 50. Mechanical filter 50 is a borasilicate cylinder, or a plastic membrane cylinder, or a porous plastic tubular cylinder having pores filtering out particles having a size greater than 0.1 to 1.0 microns from exiting the pump. In the preferred embodiment, 0.3 microns is used as the filter size. This size effectively filters most particle contaminates that may feasibly be filtered. Trapped particle contaminates can be backwashed to eliminate the buildup of particles in the pump. Mechanical filter 50 is sealed at the top against seal 32 and at the bottom against lower end 400 of filter cartridge cylinder 30 by mechanical interference (FIG. 5).

Granular activated carbon bed 52 surrounds mechanical filter 50. Granular activated carbon bed 52 is a tubular cylinder formed from fluidized granular activated charcoal with a particle size to maximize adsorption of halogens, halogen-related products and other chemicals, such as herbicides and pesticides. The fluidized granular activated charcoal provides an efficient adsorption rate with a low pressure drop.

The lower end of fluidized granular activated charcoal bed 52 is sealed by mechanical interference against the lower end 400 of filter cartridge 30. Outer plenum 54 is formed at the upper end of filter 52. Outer plenum 54 is in the shape of an annular ring formed around the top of fluidized granular activated charcoal bed 52. The dimensions of outer plenum 54 are critically selected to provide uniform flow rates through the charcoal bed 52, and up 502 to outlet 56. Outlet 56 is connected to outer plenum 54 and includes a hose barb 58 for attachment to a section of tubing as discussed below.

Uniform Fluid Flow Through the Pump

The pressure drop across the filter 54 may be characterized as $$\Delta P = C_1 Q^N$$

where $\Delta P$ = pressured drop across filter where $C_1$ = filter resistance which is a function of filter-design and the amount of particles the filter has retained where $N = 1$ for laminar flow; 2 for fully turbulent flow; and between 1 and 2 for transition flow (laminar to turbulent) The minimum work effort required to pump a given amount of water through the filter occurs at a uniform flow rate. In a double acting piston pump, the minimum work effort occurs when the flow rate is the same in the "up" and "down" strokes.

The use of a double-acting piston with the same flow rate in the "up" and the "down" stroke provides a uniform flow rate, and thus the minimum pressure drop in the pump and filters. This reduces the force necessary to operate the pump and reduces the potential of damage to the filter elements and to the pump. The equal volume in both directions of the double-acting piston, the critical dimensions of the inner and outer plenums and the use of laminar flow into the inner plenum minimize pressure drops and uneven turbulent flow to reduce the work effort required in operating the pump of the present invention.

The internal volume of inner bore 36 and the dimensions of piston rod 14 are selected under the teachings of the present invention so the volume of water displaced during the upstroke of the piston is equal to the volume of water displaced during the downstroke of the piston to further assure uniform flow and minimal pressure drop. The water displaced in the downstroke is equal to the volume of the inner bore 36 minus the volume of piston rod 14. The water displaced in the upstroke is equal to the volume of piston rod 14. Therefore, the volume of piston rod 14 must equal the volume of inner bore 36 minus the volume of piston rod 14 The dimensions of piston rod 14 and inner bore 36 can thus be varied to achieve the desired dimensions.

The dimensions of inner plenum 46 are also selected under the teachings of the present invention to minimize pressure drops and to provide uniform flow through pump 10. Inner plenum 46 is designed as an annulus around inner bore 36 with a width between the range of 0.02 to 0.05 of the diameter of the entire filter. A width smaller than this range creates a high pressure drop in inner plenum 46. A width greater than this range causes non-uniform flow through the filter creating high pressure drops in the filter. In the preferred embodiment, shown in FIG. 5, width t (distance between outside of inner bore 36 and inner surface of the filter) of inner plenum 46 is critical. This dimension is a function of the geometry of the filter system and of the flow rate. This function can be expressed in dimension-less numbers as follows:

$$R_N = \frac{\dot{V} D_p}{\mu} K \quad (1)$$

$\dot{V}$ = water velocity through plenum $\mu$ = water viscosity $D$ = effective plenum dimension = $4 \frac{A}{P}$ $A$ = cross-section area of plenum $K = \frac{L_p}{D_f}$ $L_p$ = plenum length $D_f$ = filter inner diameter $R_N$ is a Reynolds number In the preferred embodiment, inner plenum 46 has a width t between the range of 0.02 to 0.05 of the diameter of the entire filter. A width smaller than this range creates a high pressure drop in inner plenum 46. A width greater than this range causes non-uniform flow through the filter creating high pressure drops in the filter. The dimensions of outer plenum are selected as well to provide uniform flow out of the filter. Outer plenum 54 is connected to outlet 56.

Operation of the First Preferred Embodiment

In the first preferred embodiment, pump 10 is designed for lightweight, compact storage for use in travel or backpacking. Pump 10 has an overall length with lever 22 in storage position of about eight inches with filter cartridge 30 having a two inch diameter and a five inch length. The overall weight is 0.5 pounds. Pump 10 filters water under normal usage at a rate greater than 1.0 liters per minute. Filter cartridge 30 will last for approximately 100 hundred gallons under normal usage. Filter cartridge 30 is inexpensive and easily replaced after filters 50 and 52 are no longer effective. Also, filter cartridges 30 may be replaced after periods of non-use in order to prevent the effects of bacteria growth if the filters were not sterilized after use. The used filter cartridges are designed to be recyclable. These design parameters are for descriptive purposes. Other sizes and designs are considered to be encompassed by the claimed invention.

Pump 10 and the housing of filter cartridge 30 are formed from polycarbonate or another appropriate structural plastic with lever 22 formed from glass-filled or graphite fibre filled polycarbonate or another appropriate structural plastic to be lightweight yet durable. Mechanical filter 50 is formed from borasilicate, or porous plastic to be durable. Previous devices using silver impregnated ceramic tended to be fragile, with some fear of the effect of silver impregnation on drinking water. The use of fluidized granular activated charcoal provides a more efficient adsorption with a lower pressure drop than many charcoal filters. The above description is for explanatory purposes and is not meant to limit the invention as claimed. Other materials, pump designs and filter designs are considered to be within the claimed inventive concept.

Pump 10 is transported with lever 22 in the storage position as shown in FIG. 3. When it is desired to purify water from a water source, lever 22 is unfolded so that it engages pin 28 of cross head 9 FIG. 1. Water container adaptor 62 (FIG. 1) or 620 (FIGS. 17, 18 or 19), discussed below, is inserted into the opening of a water container. Prefilter 70 (FIG. 6), discussed below, is dropped into the water source. Lever 22 is operated up and down to pump water from the water source through prefilter 70 and into pump 10. The water is moved in a uniform, laminar flow by double-acting piston 16 through mechanical filter 50 to remove particulate contamination, then through carbon-bed 52 to remove chemical contamination. The water is then pumped through outlet 56 and into the water container.

After approximately 100 gallons has been pumped or after extended periods of non-use of the pump, filter cartridge 30 can be quickly and easily replaced by a new filter cartridge. The old filter cartridge is then able to be recycled.

Second Pump Embodiment

Figure 8:
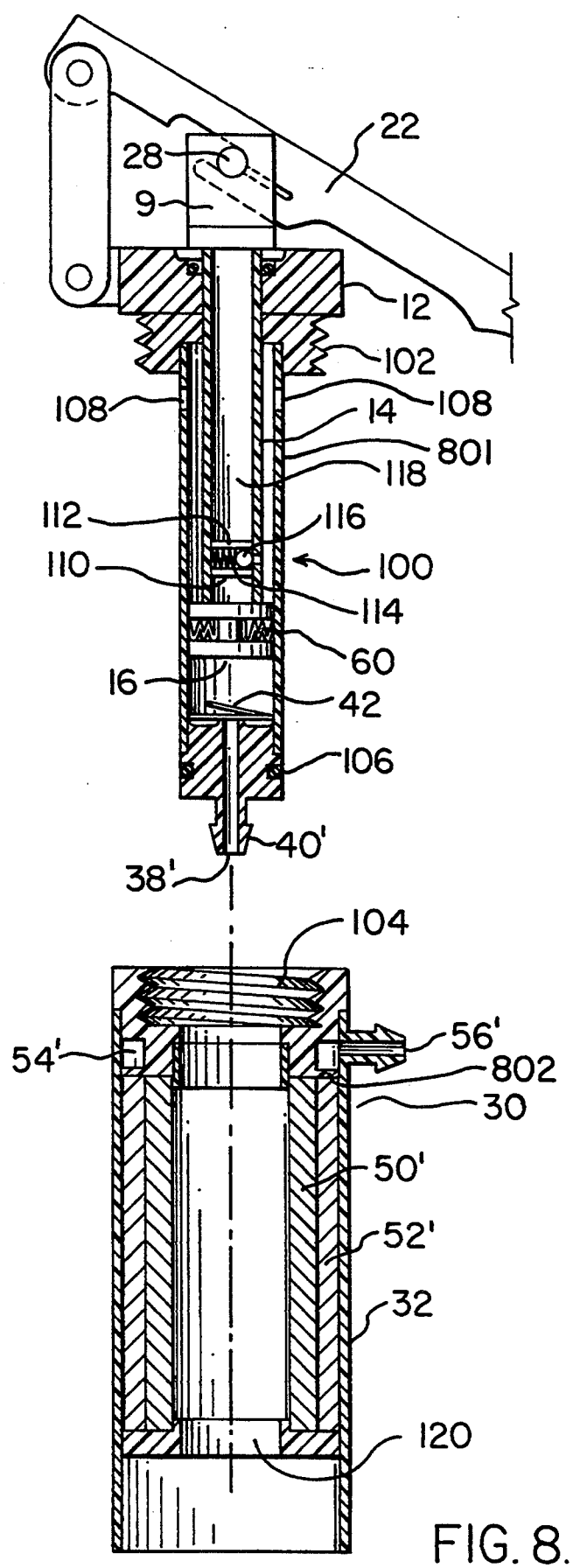
FIG. 8 is a cutaway view of a second preferred embodiment of the present invention.
Figure 9:
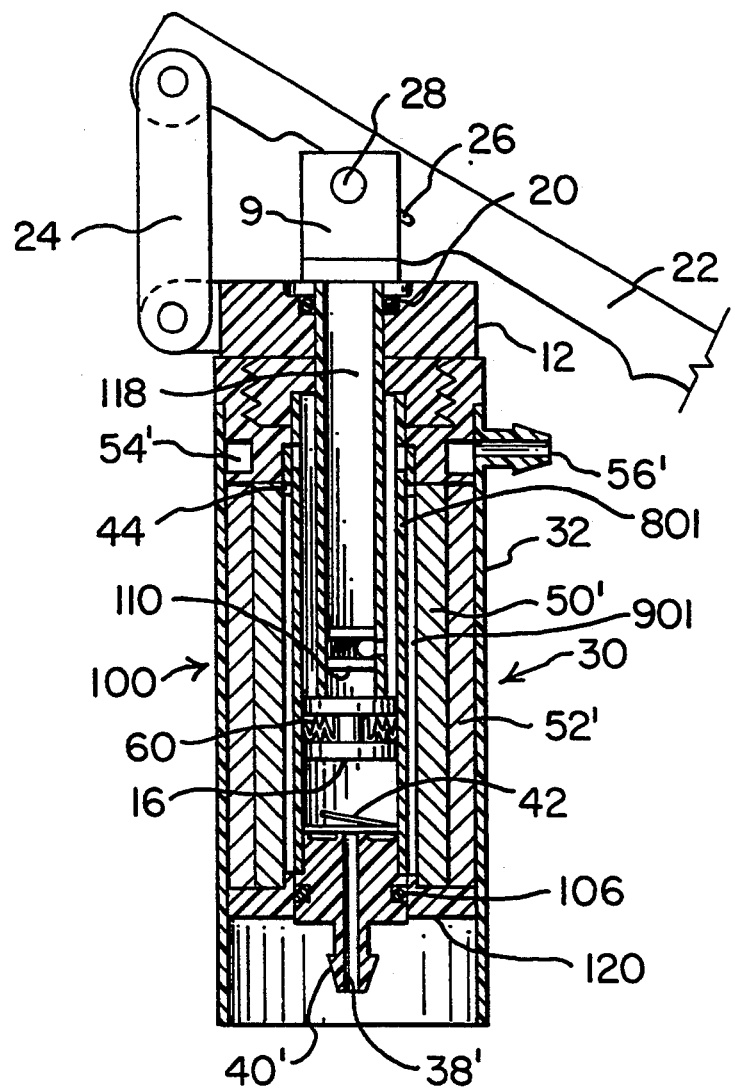
FIG. 9 is a cutaway view of the embodiment of FIG. 8 assembled.

A second possible preferred embodiment is illustrated in FIGS. 8 and 9. This embodiment operates similar to the above-described embodiment. As illustrated in FIG. 8, an inner pump cylinder 100 is formed on pump housing 12. Inner pump cylinder 100 includes threaded attachment 102 which mates with threaded attachment 104 on filter cartridge 30. Filter cartridge 30 has an inner mechanical filter 50', identical to filter 50 described above, carbon bed 52', identical to carbon bed 52 described above, lip 802 similar to lip 502 of FIG. 5 and outlet plenum 54' attached to outlet 56', both similar to 54 and 56 described above.

Inner pump cylinder 100 includes an inlet opening 38' which opens through inlet valve 42 into inner pump cylinder 100. U-cup or O-ring 106 is mounted near the bottom of inner pump cylinder 100 adjacent inlet opening 38' and bait 40'. Inner pump cylinder 100 has a thin-walled casing 108 in which piston 16 is movable. Seal 60 interacts with inlet valve 42 to provide the double-acting performance described above.

Pressure relief valve 110 is also illustrated in FIGS. 8 and 9. Pressure relief valve 10 includes radial hole 112 formed in piston rod 14 above piston 16. Longitudinal passage 118 is formed in piston rod 14 communicating with radial hole 112 and an opening formed in piston rod 14. Spring 114 is inserted in radial hole 112 biasing ball 116. The bias is selected so that when pressure builds up in pump cylinder, from clogging of the mechanical filter 50 or other causes, ball 116 is forced inward against spring 114 to allow water to flow up through passage 118 and out of the pump to relieve the pressure build up.

Inner pump cylinder 100 is easily assembled onto pump housing 32 by screwing the threaded elements 102 and 104 together. U-cup seal ring 106 seals the lower portion of inner pump cylinder 100 against lower portion 120 of the filter cartridge housing (FIG. 8). Inner plenum 901 (FIG. 9) comprises the space between the outer wall 801 of inner pump cylinder 100 and the inner wall of mechanical filter 50'. The baffle 44 (FIG. 9) works similar as above to create uniform, laminar flow into the filters. The pump works as did the earlier described embodiment to provide uniform pressure and flow through the pump. The second embodiment allows a more inexpensive filter cartridge to be used, since the inner pump cylinder remains with the pump housing.

Second Lever Embodiment

A second preferred embodiment (FIGS. 11-13) of the attachment of lever 220 (similar to lever 22 of FIG. 1 to a cross head 260 (similar so cross header of FIG. 1) and piston rod not shown but similar to piston rod 14 of FIG. 1. Lever 220 is similar to lever 22 of FIG. 1 in function. Lever 220 includes a textured gripping portion 222 for ease in grasping lever 220. Lever 220 also includes rectangular reduced portion 224 (FIG. 11) with reduced width portions 226, 228 (FIG. 11) to reduce the overall weight of the pump. Attachment means 230 of lever 220, shown in FIG. 11, includes a circular hole portion 232 having hole or keyway portions 234 superimposed on the circumference of hole portion 232.

Pivot mid-link 240 (FIG. 11) having reduced width portion 242 is pivotally secured to handle 220 by pin 244. The opposing lower end of pivot link 240 is pivotally secured onto collar 250 by pin 246. Lever 220 is thus able to be pivoted against pump 30, as shown in FIG. 11, for compact storage.

Piston assembly 8 (FIG. 11) includes a cross head 260 (comparable to cross head 9 of FIG. 1) and a piston rod 14 (not shown) and a piston 16 (not shown) since they are comparable to elements 12 and 16 of the embodiment of FIGS. 1-5. Cross head 260 is affixed to the top of piston rod 14 (not shown) to move a piston similar to piston 16 with a mechanical advantage. Cross head 260, as shown in FIG. 12, includes rectangularly shaped slot 262 in the top of cross head 260 and a substantially circular hole 264 in the lower wall 270 of slot 262 and which extends perpendicular to slot 262. Slot 266 extends along one side of hole 264, as discussed in detail below, and terminates in upper end wall 268. Lower wall portion 270 is formed on cross head 260 opposite top end wall 268.

Cam surface 272 is formed on outside of lower wall portion 270 beginning at the terminus of slot 266 and forming an outwardly sloping ramp surface on the outer surface of wall portion 270. Cam surface 272 starts in slot 266 (where it is relatively thin) and terminates after a 270 degree (counterclockwise) rotation to its thickest portion in detent slot 276 (FIGS. 15).

Captured pin assembly 280 (FIG. 12) includes handle 282 and backing flange 284 affixed to the top end of pin portion 286 which is formed of a low friction material and has a diameter to closely fit within hole 264. Pin 288 extends perpendicularly out of one side of the lower end of pin 286. Pin assembly 280 (FIG. 12) is assembled onto cross head 260 by inserting pin 286 through hole 264 so that its lower end extends out of lower wall portion 270. Pin 288 is then inserted into the lower end of pin 286 to "capture" pin 286 onto cross head 260. Upper end wall 268 of hole 264 prevents pin 280 from exiting cross head 260.

Lever 220 is moved from the storage position, shown in FIG. 11 to the operating position, as indicated by arrows 300, 302 shown in FIG. 13, when pump 30 is to be operated. Mid portion 230 of lever 220 (FIG. 13) is inserted into slot 262 of cross head 260 so that hole 232 (FIG. 11) of handle portion 230 is aligned with hole 264 in cross head 260. In this position, key slot 234 (FIG. 11) will also be aligned with slot 266. Pin assembly 280, as shown in FIG. 14, is then pushed, as indicated by arrows 304 and 306 (FIG. 14) through hole 264 of cross head 260 and hole 232 of lever 220. Once pin 288 clears hole 264, handle 282, as shown in FIG. 15, is rotated counterclockwise, as indicated by arrow 308. This causes pin 288 to move against sloping cam surface 272 as indicated by arrow 310 (FIG. 15). Pin 286 and cross head 260 are resiliently compressed by the action of pin 288 against sloping cam surface 272 so that as pin 288 enters detent slot 276, pin 288 (FIG. 15), is resiliently biased into detent slot 276. Thus, lever 220 is securely affixed to cross head 260. Lever 220 can then be moved up and down to move piston 12 within the pump cylinder to force fluid through the filter.

To prepare pump 30 for storage, the procedure is reversed. Pin 288 is rotated clockwise until pin 288 is aligned in slot 266. Handle 282 is withdrawn until pin 286 abuts against end wall 268. Lever 220 is then pivoted upward and against the wall of pump 30. Pump 30 is then in the compact storage position.

Adaptor

Outlet bark 56 (FIG. 2) is connected to a section of tubing 58, illustrated in FIG. 1, leading to water container adaptor 62. Adaptor 62 is designed to closely fit within the openings of most standard water containers. In one preferred embodiment, shown in FIG. 1, adaptor 62 has a first section 64 to fit smaller openings and a second section 66 to fit larger openings. This allows hands free operation of the device without having to hold the water container being filled. The fit of adaptor within the water container opening is such that should the water container tip or fall over, filtered water will not spill out and contaminates will not enter the water container. Adaptor 62 can also be designed to screw into the openings of the water containers. Tubing 58 can be clamped or bonded onto hose barb 56 and onto outlet adaptor 62 if desired.

Second Bottle Adaptor

Figure 17:
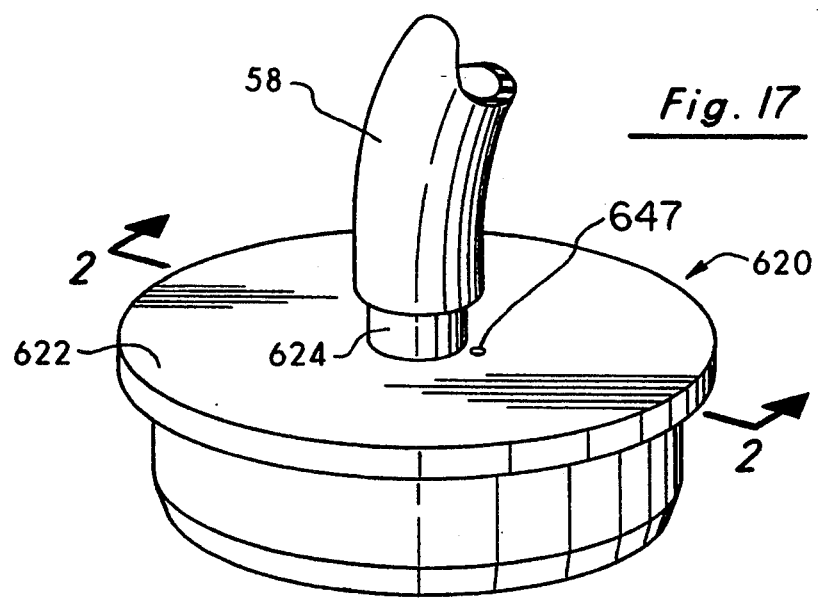
FIG. 17 is a perspective view of a second embodiment of the bottle adaptor of the present invention.
Figure 18:
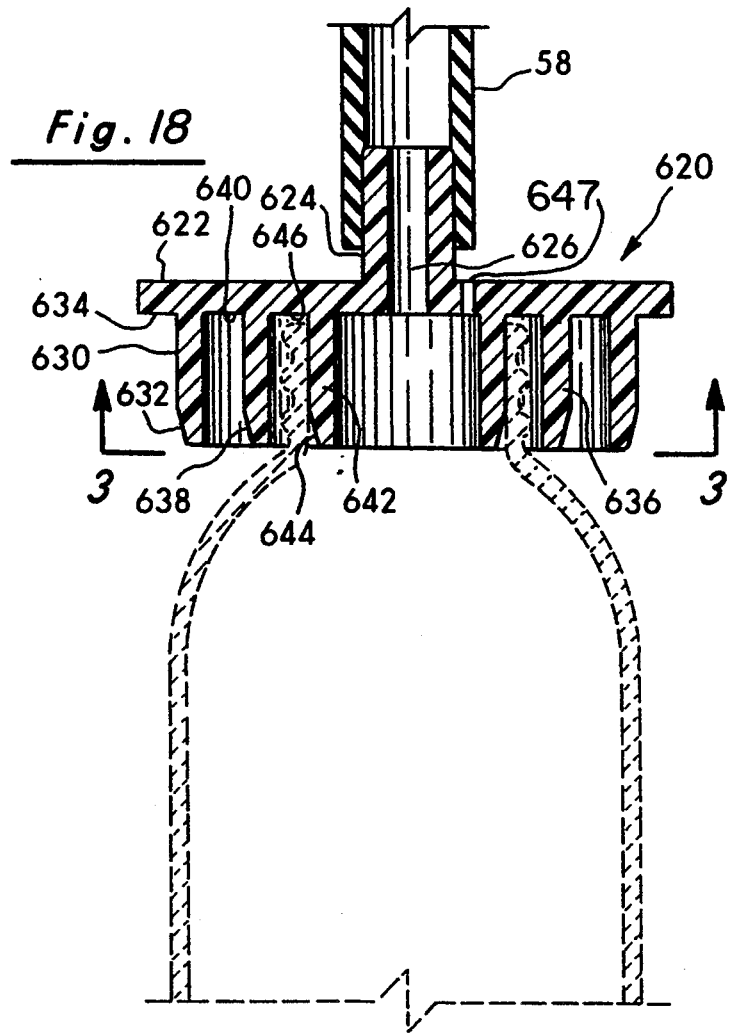
FIG. 18 is a side cutaway view along lines 2—2 of FIG. 17 mounted on a water container.
Figure 19:
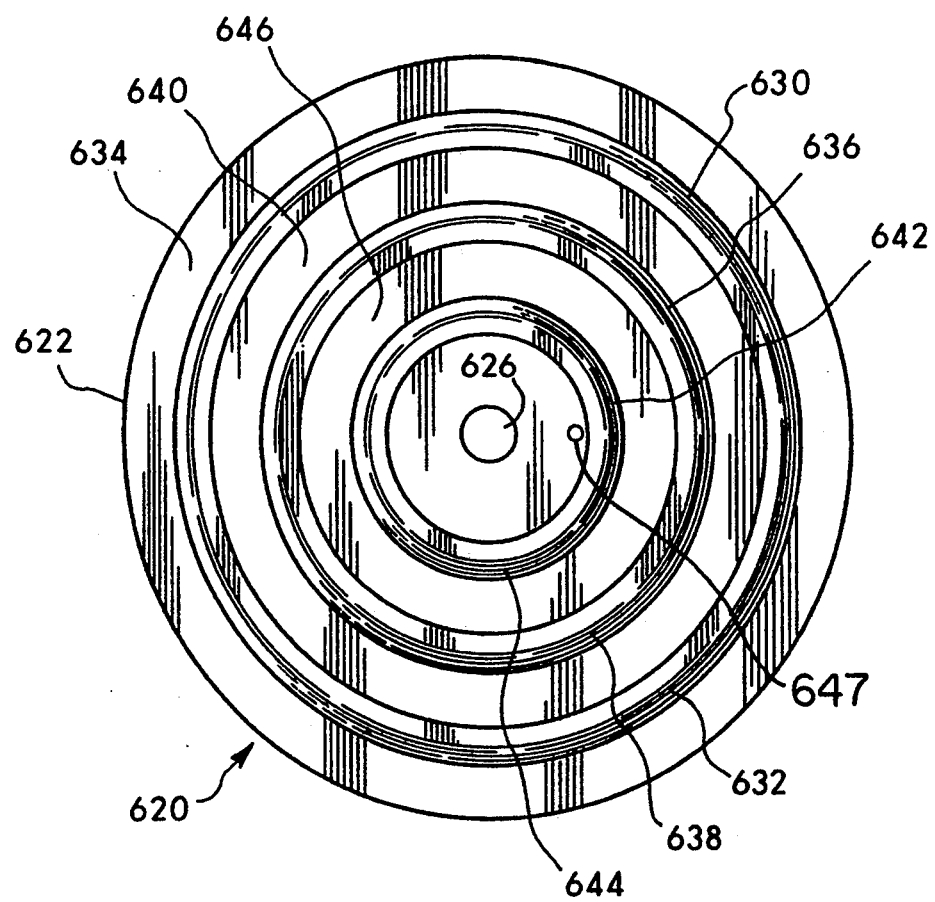
FIG. 19 is a bottom view of the bottle adaptor of FIG. 17.
Figure 9:
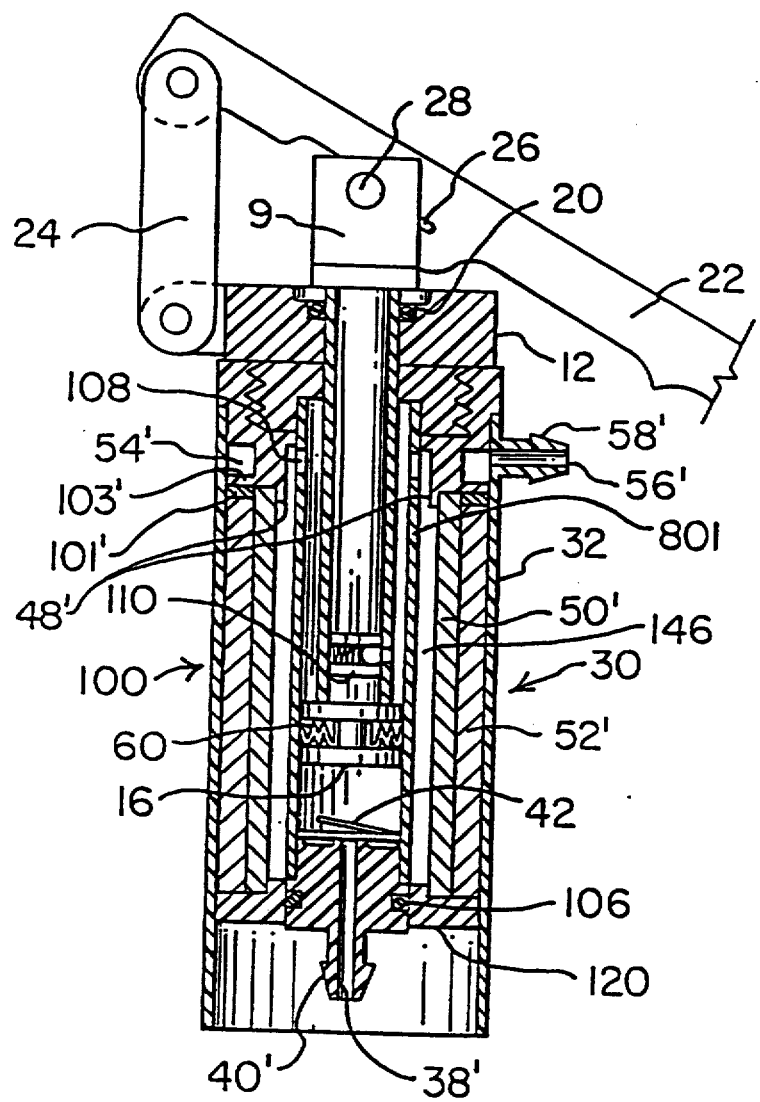

A second preferred embodiment of bottle adaptor 62 is shown in FIGS. 17-19. Bottle adaptor 620 (FIG. 17), includes a cylindrical portion 622. Cylindrical hose connector 624 (FIG. 18) extends upwardly from the center of the upper surface of cylindrical portion 622 for connection to outlet hose 58. Opening 626 (FIG. 18), extends through the center of hose connector 624 so that filtered fluid can be pumped through hose 58 and through adaptor 622. Air vent 647 is located adjacent the inlet 626 to allow the compressed air in the water bottle to leave the water bottle as the water bottle is filled.

A series of concentrically spaced rings 630, 636, 642 (FIGS. 18 and 19) extend perpendicularly downward from the lower surface of cylindrical portion 622. Rings 630, 636, 642 have outer diameters sized to respectively fit snugly within the openings of standard sized water containers. The lower edges 632, 638, 644 of each ring 630, 636, 642 are tapered to provide ease of insertion into the appropriate water container. Also, each ring 630, 636, 642 includes an upper sealing portion 634, 640, 646 to seal the water container from spillage. The adaptor is formed of a resilient material to allow the adaptor to snugly conform to the desired water container opening. Thus, different sizes of water containers can be easily filled with filtered fluid by hands-free operation and without danger of spillage or contamination.

Prefilter

Filter cartridge inlet 38, as illustrated in FIG. 2 is connected to prefilter 70 (FIG. 1) by tubing 72. If desired, tubing 72 can be securely attached by clamps or bonding to inlet 38 over hose barb 40 and to prefilter 70 over hose barb 74 shown in FIG. 6. Typically, a 0.25 to 0.38 inch internal diameter elastomer or plastic tubing is used at a length up to 5 feet. Prefilter 70 is dropped into a water source to filter out large particle contaminates down to 70 to 120 microns in size. Pump 10, under normal usage, is able to "pull" water easily at least through an elevation of 5 feet. This allows the user to comfortably operate the pump without kneeling or actually getting into the water source.

Figure 6:
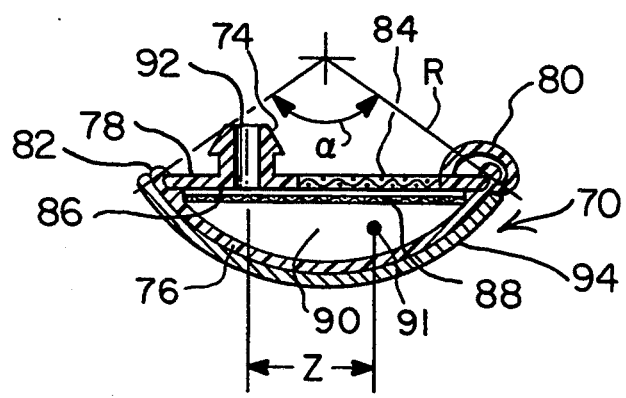
FIG. 6 is a cutaway view of the prefilter of the preferred embodiment.

As illustrated in FIG. 6, prefilter 76 has a semi-spherical-shaped lower portion 76. Upper portion 78 is attached to lower portion 76 by living hinge 80 and snaplock 82 so that upper portion 78 can be easily opened to clean prefilter 72. Inlet opening 84 having a molded or woven or metal mesh screen with 0.01 to 0.02 millimeter pore size, is formed in upper portion 78. Filter screen 88 is mounted in the interior 90 of lower portion 76 formed of either metal or plastic and filtering particles larger than 100 microns.

The geometry and weight of prefilter 70 are critically determined to insure that inlet opening 84 is under water in both still and moving water. The geometry also insures that inlet opening 84 is away from the bottom of a still water source and is downstream in moving water. This minimizes the intake of particles into the prefilter. The weight of prefilter 70 provides an effective specific gravity (weight of prefilter/volume of prefilter) to have the prefilter below the surface in still water and moving water. Moving water is defined as flow velocity greater than 2 feet per second. In the preferred embodiment, prefilter 70 has a specific gravity greater than 0.1 pounds per cubic inch.

Prefilter 70 has a semi-spherical shape to maintain the inlet screen facing away from the bottom of the water source in still water and downstream in moving water. The prefilter housing is chosen to have a radius R with an included angle between ninety and one-hundred-forty degrees.

The geometry of the prefilter 70 causes the prefilter 70 to locate in moving water tilted so that the inlet screen of the prefilter is facing downstream to reduce the amount of particles borne by the moving water from impinging on the inlet screen as shown in FIG. 10. This tilt is caused by the combination of the hydraulic forces on the spherical surface of the prefilter 94 and the moment caused by the distance between the inlet tube connection 74 and the center of gravity of the prefilter 91. This distance 7 must be 0.5 to 0.5 of the radius R of the sphere as shown in FIG. 6.

Operation of Prefilter 70 (FIG. 6 and 10)

Water is drawn by pump 10 through inlet screen 84 down through filter screen 88 into the interior 90. The water then is drawn through outlet 92 up through tubing 72 into inlet 38 of filter cartridge 30 of pump 10. Prefilter 70 screens large particle contaminates from pump 10 to increase the life of disposable filter cartridges 30. Upper portion 78 (FIG. 6) can be unsnapped to clean each of the filters 86 and 88 as necessary. If desired upper portion 80 can be rolled over and permanently affixed to upper portion 78 if it is not desired to open prefilter 70 for cleaning.

The majority of contaminates typically on the surface of the water source. Prefilter 70, by sinking below the surface in moving and still water, misses the surface contaminates. Additionally, in still water, prefilter 70 is held with inlet opening 84 in an up position to prevent bottom dirt from being pulled into prefilter 70. Also, the offset location of the hose barb causes a moment between the inlet tube and the center of gravity of the prefilter 70. In moving water, this will cause the lower portion to move downstream first, thus tilting upper portion 78 and inlet opening 84 in the downstream position. This prevents waterborne large particles from flowing into inlet opening 84 and reducing clogging of prefilter 70.

Prefilter 70 is designed to be small, lightweight, inexpensive and to create an insignificant pressure drop to allow uniform flow through pump 10. In the descriptive preferred embodiment, prefilter 70 has an outer diameter of less than 1.75 inches and a pressure drop of less than 0.25 psi at a flow rate of 1.0 liters per minute.

Prefilter 70 and water container adaptor 60 allows pump 10 to be used by a single person without the need for additional assistance or contortions in filtering from a stream or other water source.

Additional Conditioning Units

Figure 7:
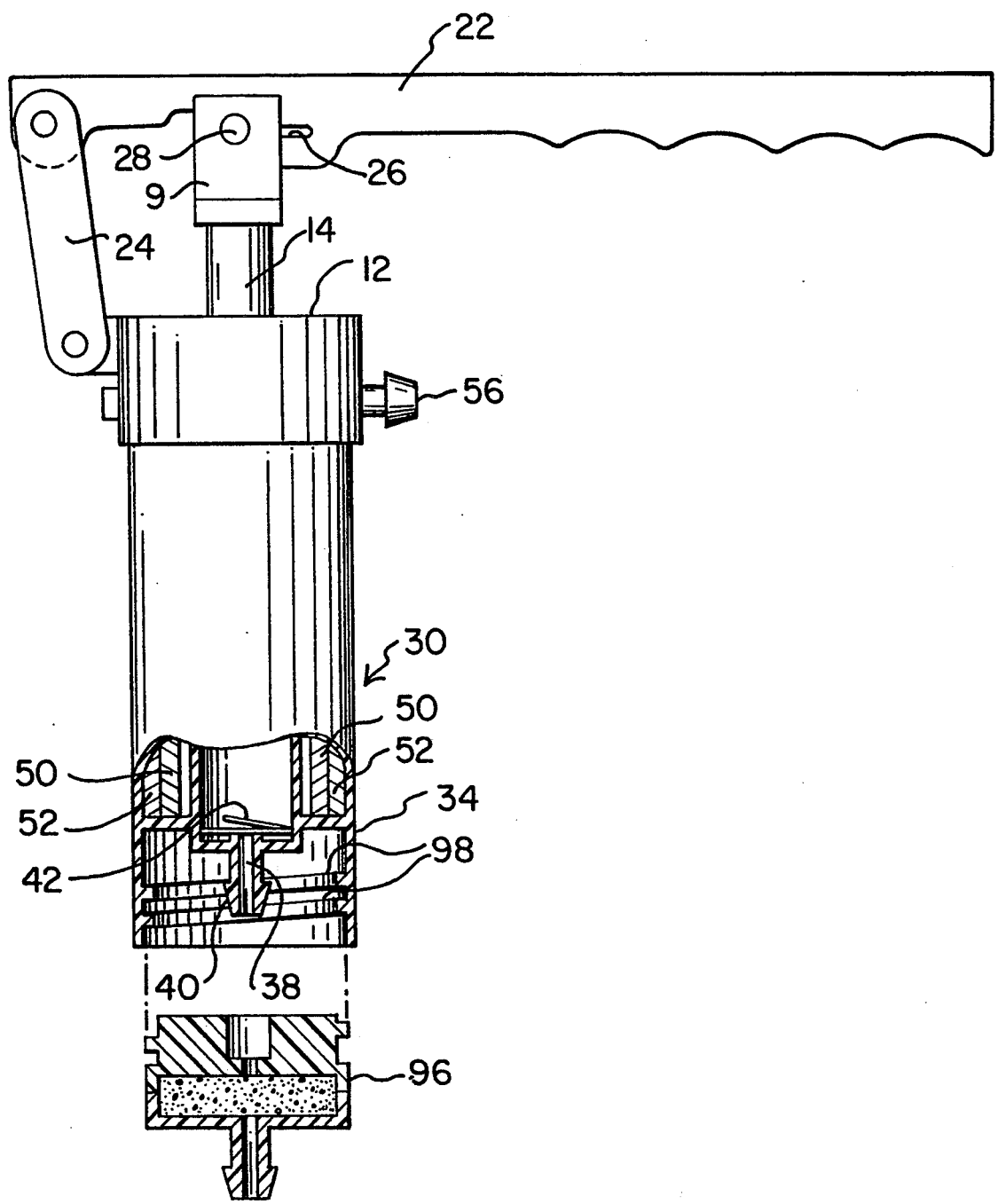
FIG. 7 is a view of a pump of the preferred embodiment with a pre-conditioning unit attached.

Filter cartridge 30 is adapted to be fitted with additional pre-conditioning or post-conditioning units for further purification of water. For instance, as illustrated in FIG. 7, pre-conditioning unit 96 is attached to the lower end of filter cartridge 30 by a screw-on attachment 98. Pre-conditioning unit 96 contains an iodine-coated resin bed to kill viruses, bacteria, and the like which are too small to be filtered out. Fluidized granular activated charcoal bed 52 then absorbs any iodine ions in the water.

The present invention provides a lightweight, compact, inexpensive filtration unit that is easily used. The claimed invention is not meant to be limited by this description. Other embodiments and variations are considered to be within the inventive scope of the claimed invention.

We claim:

1. A pump for fluid filtration, said pump comprising:
   a housing having an inlet and an outlet;
   filtering means within said housing operatively connected to said inlet and to said outlet for filtering fluid;
   a cylinder in the interior of said housing operatively connected to said inlet and to said filtering means;
   a piston assembly disposed in said cylinder and comprising a piston cross head and a piston rod and a piston;
   an elongated lever means pivotally connected at one end to said housing, and connectable to said piston cross head by an elongated pin;
   said piston being slidably positioned within said cylinder and movable by said lever means for pumping fluid from said inlet through said cylinder and said filtering means and out of said outlet;
   means including said elongated pin for engaging said lever means and said piston cross head at a location on said lever means intermediate the ends of said lever means to move said piston with mechanical advantage within said cylinder and for disengaging said lever means and said piston cross head to allow said lever means to be moved to a storage position;
   wherein said means for engaging includes:
   detent means formed on a front surface of said piston cross head;
   said elongated pin being inserted transversely through said lever means and a portion of said piston cross head;
   means for rotating said elongated pin in a first direction about its longitudinal axis;
   cam follower means connected to said elongated pin and responsive to said rotation in said first direction for resiliently engaging said detent means for preventing said lever means from disengagement from said piston cross head; and
   means for rotating said elongated pin in a second direction for enabling the disengagement of said lever means from said elongated pin to allow said lever means to be moved to a storage position.

2. The pump of claim 1 wherein said means for engaging further includes:
   a cam surface formed on said front surface of said piston cross head perpendicular to the longitudinal axis of said elongated pin inserted through said lever means and said portion of said piston cross head; and
   said means for resiliently engaging includes said cam follower means for engaging said cam surface to provide a resilient bias as said elongated pin is rotated in said first direction to engage said cam follower means with said detent means.

3. The pump of claim 2 wherein said cam follower means include a cam follower pin extending perpendicularly from the longitudinal axis of said elongated pin near a front end of said elongated pin; and
   said detent means include a slot formed in said cam surface.

4. The pump of claim 3 wherein said cam follower pin is captured on said piston cross head when said elongated pin and said cam follower pin is rotated in said first direction to engage said detent means to prevent disengagement of said lever means from said piston cross head;
   said elongated pin being rotated in a second direction to enable the disengagement of said lever means from said piston cross head, said elongated pin being free to move in a direction parallel to its longitudinal axis and to rotate about its longitudinal axis; and
   capture means for preventing the removal of said elongated pin from said piston cross head.

5. The pump of claim 1 wherein said pump further comprises a container adapter connected by a flexible tube to said pump outlet for engagement with an opening of a container;
   said container holding fluid pumped and filtered by said pump;
   a plurality of concentric cylinders having tapered ends forming different diameter openings on said container adaptor for enabling sealing by interfering engagement of said Container adapter with a plurality of differing diameter container openings.

6. The pump of claim 1
   wherein said lever means comprises:
   a mid-link pivotally connected at one end to said housing;
   an elongated handle pivotally connected at one end to a second end of said mid-link;
   a hole through said elongated handle for receiving said pin at a location intermediate the ends of said handle;
   wherein said pivotal connection Of said mid-link to said housing and said handle to said mid-link and said connection of said handle to said piston cross head by said pin define means for causing a linear movement of said piston in said cylinder in response to a pivotal movement of said handle about said one end.

7. A pump for filtration of fluids, said pump comprising:
   a housing having an inlet and an outlet;
   filtering means within said housing and operatively connecting with said inlet and said outlet for filtering fluid;
   a cylinder in the interior of said housing and operatively connected to said inlet and to said filtering means;
   a piston assembly disposed in said cylinder and comprising a piston cross head and a piston rod and a piston;
   a lever means for moving said piston within said cylinder at a mechanical advantage;
   means for pivotally connecting one end of said lever means to said housing;
   a hole extending through said lever means transversely to the longitudinal axis of said lever means;
   said hole being located intermediate to the ends of said lever means;
   said piston being moved by said lever means within said cylinder for pumping fluid from said inlet through said cylinder and said filtering means and out of said outlet;
   an elongated pin removably inserted through said hole in said lever means but retained in said piston cross head said elongated pin including means for removably engaging said lever means with said piston cross head for pumping said fluid;
   said elongated pin including means for being removable from said hole in said lever means to disengage said lever means from said piston cross head so that said lever:means can be pivoted about a first and a second pivot point and positioned adjacent and parallel to a side of said housing to define a storage position of said pump;

an inclined cam surface formed on a front surface of said piston cross head perpendicular to the longitudinal axis of said elongated pin;

a detent slot formed in said cam surface; said means for removably engaging including a cam follower pin connected to and positioned near an end of said elongated pin, said cam follower pin including means for engagement with said cam surface to resiliently bias said cam follower pin into said detent slot and to resiliently bias said elongated pin to prevent disengagement of said lever means from said piston cross head in response to a rotation of said elongated pin in a first direction about its longitudinal axis; and said means for resiliently engaging being effective upon the rotation of said elongated pin about its longitudinal axis in a second direction for enabling the disengagement of said lever means from said elongated pin and said piston cross head, 8. The pump of claim 7 wherein said pump further comprises means for securing said elongated pin from removal from said piston cross head with said elongated pin being free to move perpendicular to the motion of said piston and said lever means and being free to rotate about its longitudinal axis.

9. The pump of claim 7 wherein said pump further comprises:

a container adaptor connected by a flexible tube to said pump outlet;

said container adaptor including a plurality of concentric cylindrical surfaces having different diameters wherein each concentric cylindrical surface has a constant diameter section and a tapered end of reduced cylinder diameter;

each of said plurality of concentric cylindrical surfaces with said tapered ends has a different diameter for interferingly engaging differing sizes of container openings to seal said container.

10. A method of filtering fluid through a pump having a piston, a piston head and a lever means, said method comprising the steps of:

inserting an elongated pin transversely through said lever means on said pump and through at least a portion of said piston cross head connected to said piston to secure said lever means with said piston cross head by means of a cam follower mounted near a front end of said elongated pin;

said lever means being effective for moving said piston at a mechanical advantage;

rotating said inserted elongated pin in a first direction about its longitudinal axis to resiliently bias said cam follower into engagement with a detent slot formed on a front surface of said piston cross head to prevent said lever means from disengagement with said piston cross head; and operating said lever means with mechanical advantage to move said piston within said pump for pumping fluid through a filter in said pump to filter said fluid, 11. The method of claim 10 wherein said step of resiliently biasing said cam follower further includes the steps of:

providing a sloping cam surface on said front surface on said piston cross head perpendicular to the longitudinal axis of said elongated pin; and rotating said elongated pin about its longitudinal axis in a first direction so that said cam follower engages said sloping cam surface with increasing force as said elongated pin is rotated until said cam follower engages said detent slot to prevent the disengagement of said lever means from said piston cross head; and rotating said elongated pin in a second direction about its longitudinal axis to disengage said cam follower from said detent to enable the disengagement of said lever means from said piston cross head, 12. The method of claim 10 wherein said method further comprises the steps of:

providing a container adaptor having a plurality of concentric cylindrical surfaces each having a constant diameter section and a tapered end where the diameter of said cylindrical surface is sized to interferingly engage said constant diameter section of said cylindrical surface with differing sizes of openings in various containers;

connecting said container adaptor to the outlet of said pump by a flexible tube; and inserting the tapered end of one of the said concentric cylindrical surfaces into the opening of a container.

13. A pump for fluid filtration, said pump comprising:

a housing having an inlet and an outlet;

filtering means within said housing operatively connected to said inlet and to said outlet for filtering fluid;

a cylinder in the interior of said housing operatively connected to said inlet and to said filtering means;

a piston assembly disposed in said cylinder and comprising a piston cross head and a piston rod and a piston;

an elongated lever means comprising a mid-link and an elongated handle;

means for pivotally connecting one end of said mid-link to said housing;

means for pivotally connecting one end of said elongated handle to a second end of said mid-link;

a hole extending transversely through said handle intermediate the ends of said handle;

said piston being moved within said cylinder by said handle and said mid-link for pumping fluid from said inlet through said cylinder and said filtering means and out of said outlet;

means for storing said pump in which said handle and said mid-link are positioned adjacent to and parallel to said side portion of said housing;

means for operating said pump in which said handle and said mid-link are pivotally rotated about said first one end of said mid-link and said one end of said handle away from said side portion of said housing and positioned so that the portion of said handle containing said hole is engaged with said piston cross head;

a hole in said piston cross head extending from a rear portion of said piston cross head to a front surface of said piston cross head;

a rotatable elongated pin slidably extended through said hole of said piston cross head and said hole of said handle so that a front end portion of said elongated pin protrudes beyond said front surface of said piston cross head; and detent means on said front surface of said piston cross head for inhibiting the withdrawal of said front end portion of said elongated pin away from front surface of said piston cross head to prevent disengagement of said handle from said piston cross head;

said pivotal connection of said mid-link to said housing and said handle to said mid-link and said connection of said handle to said piston cross head by said elongated pin are effective when said handle is secured to said piston cross head by said elongated pin to define means for causing a linear movement of said piston in said cylinder with mechanical advantage in response to a pivotal movement of said handle about its first end.

14. The pump of claim 13 wherein said elongated pin includes:

said front end and a rear end; and a cam follower pin connected near said front end of said elongated pin and extending from said elongated pin substantially perpendicular to the longitudinal axis of said elongated pin to enable the engagement of said cam follower pin with said detent means when said front end of said elongated pin extends through said piston cross head beyond said front surface of said piston cross head.

15. The pump of claim 14 said pump further includes:

a keyed opening in said piston cross head coaxial with said hole in said piston cross head, a top portion of said piston cross head comprising a U-shaped opening extending through said piston cross head transverse to said hole in said piston cross head for receiving said portion of said handle containing said hole; and a second keyed opening coaxial with and extending through said hole in said handle, wherein said elongated pin and said cam follower pin are slidable through said keyed opening in said piston cross head and said piston handle when said elongated pin is extended through said hole in said piston cross head hole and said hole in said handle.

16. The pump of claim 14 wherein said detent means includes:

a cam surface formed on said front surface of said piston cross head so that as said elongated pin is rotated about its longitudinal axis from a first position to a second position said cam follower pin slides on said cam surface causing an increasing deformation of said elongated pin and an increasing resultant force on said cam follower pin; and said detent means being formed on said cam surface for retaining said cam follower pin due to this said force on the cam follower pin as said elongated pin is rotated from said first to said second position so that said cam follower pin enters said detent means to prevent disengagement of said handle from said piston cross head.

17. The pump of claim 16 wherein said pump further include a knob on the rear end of said elongated pin providing means for rotating said elongated pin in said first direction to prevent the disengagement of said handle from said piston cross head and for rotating said elongated pin in a second direction to enable the disengagement of said handle from said piston cross head.

18. The pump of claim 13 wherein said piston cross head further includes:

a substantially U-shaped opening formed in a top portion of said piston cross head for receiving said handle so that said elongated pin can be extended through said hole of said piston cross head and said hole in said handle.

19. The pump of claim 18 wherein said piston cross head comprises:

a substantially flat rear portion;

a substantially flat front portion parallel to and spaced apart from said rear portion;

a bottom portion extending transverse to and between the bottom portions of said rear and front portions;

said substantially U-shaped open portion defined by the space between said rear and front portions;

said substantially U-shaped portion defining means for receiving said handle so that said elongated pin can be extended through said hole in said handle and said hole in said piston head to engage said handle with said piston head.

20. A pump for fluid filtration, said pump comprising:

a housing having an inlet and an outlet;

filtering means within said housing operatively connected to said inlet and to said outlet for filtering fluid;

a cylinder in the interior of said housing operatively connected to said inlet and to said filtering means;

a piston assembly disposed in said cylinder and comprising a piston cross head and a piston rod and a piston;

an elongated lever means pivotally connected at one end to said housing, and connectable to said piston cross head;

said piston being movable within said cylinder by said lever means for pumping fluid from said inlet through said cylinder and said filtering means and out of said outlet;

means for engaging said lever means with said piston cross head at a location on said lever means intermediate the ends of said lever means to move said piston with mechanical advantage within said cylinder and for disengaging said lever means and said piston cross head to allow said lever means to be moved to a storage position;

wherein said means for engaging includes:

a locking means comprising a part of said piston cross head;

retaining means inserted transversely through said lever means and a portion of said piston cross head;

means for operating said retaining means and said locking means for preventing said lever means from disengagement from said piston cross head; and means for operating said locking means to enable the disengagement of said lever means from said retaining means to allow said lever means to be moved to a storage position.

* * * * *

UNITED STATES PATENT AND TRADEMARK OFFICE
CERTIFICATE OF CORRECTION

PATENT NO. : 5,366,642
DATED : November 22, 1994
INVENTOR(S) : Platter, et al.

It is certified that error appears in the above-identified patent and that said Letters Patent is hereby corrected as shown below:

On the Title page, item [22], Filed: change filing date from "Dec. 15, 1992' to --Dec. 14, 1992--.

Please substitute the attached Fig. 9 for Figure 9 on Sheet 7 of 11 of Patent 5,366,642 as printed.

Signed and Sealed this

Second Day of May, 1995

Attest:

BRUCE LEHMAN

Attesting Officer

Commissioner of Patents and Trademarks